Patented Mar. 15, 1949

2,464,204

UNITED STATES PATENT OFFICE 2,464,204

METHOD AND MEANS FOR REMOVING OIL AND OILY SUBSTANCES FROM SOLID OR WATER SURFACES

Irvin Baker, Baltimore, Md.

No Drawing. Application June 28, 1946, Serial No. 680,102

6 Claims. (Cl. 210—16)

(Granted under the act of March 3, 1883, as amended April 30, 1928; 370 O. G. 757)

This invention relates to a method and materials for removing oil and oily substances from solid or water surfaces. In particular the invention relates to the provision of oleophilic and hydrophobic powders and to the method of application of such powders in the removal of oil and oily substances from the above type of surfaces.

It is, therefore, one object of this invention to provide a powder, the particles of which are coated with a material which will adsorb oil and oily substances from solid or water surfaces.

It is also an object of this invention to provide a coated powder which is hydrophobic and oleophilic in character and which because of its greater specific gravity will submerge when cast upon a water surface thereby removing any oil or oily substance floating on the water.

It is a further object of this invention to provide an oleophilic and hydrophobic powder of a specific gravity less than that of water which, when cast upon an oily water surface, remains afloat after adsorption of the oily substance and can be recovered by "scooping" or otherwise.

Oils, oily substances and numerous organic liquids can be rapidly and economically removed from the surfaces of such objects as pilings, piers, or ships and from water surfaces by the method of this invention. Substances which may be classified under the heading of oils or oily substances referred to in this invention are organic compounds or complexes such as fuel oils, lubricating oils, gasoline, paint vehicles and thinners and numerous other materials that are immiscible with and lighter than water. They are generally found in abundance around shipyards or in streams in the vicinity of oil plants and are referred to as "slicks."

The components of the oil slicks are, as a rule, readily combustible. Therefore, they result in the formation of a serious fire hazard, particularly around shipyards. The oil slicks float on the surface of the water and gradually spread, accumulating on wooden piers, shipsides and collecting under piers and in small crevices. All of these are dangerously flammable fire hazards. Numerous instances of fires resulting from these oil slicks have been recorded along with the accompanying loss of life and material. Welding operations on ships are generally stopped since the welders' sparks may ignite the oil slick.

Also the presence of oil slicks on waters inhabited by fish has proven sufficiently offensive to result in their disappearance from the scene in a short period of time. The Federal Game Commission has invoked statutes to severely prosecute those responsible for the oil slicks. Oils, tars and sludges from the petroleum industry are per se harmless with respect to fish life but tend to render the water unsuitable since they float on the surface and prevent reoxygenation of the water, thereby impeding organic purification and lowering the quantity of oxygen available for fish life. The presence of slicks also destroys recreational areas.

The necessity of eliminating oil pollutions has resulted in considerable research to evolve a satisfactory solution to the problem. To be of commercial value the method must be easy to apply, must permanently remove the oil, must be economical and must remove the slick quickly.

This invention involves the application of physical-chemical surface phenomena. Wetting is the phenomena occurring when a solid phase and a liquid phase come in contact in any manner so as to form a solid-liquid interface. If contact between the solid and the liquid results in a decrease in surface tension, the liquid will displace the air or any liquid of greater liquid-solid interfacial tension from the solid. If the contact angle between the solid and liquid surfaces is zero, wetting occurs. The result can be measured and expressed as the adhesion tension between the solid and the liquid and is defined by the following equation:

$$A = \gamma S - \gamma SL$$

where $A$ = Adhesion tension
$\gamma S$ = Surface tension of the solid
$\gamma SL$ = Surface tension between the solid and liquid (interfacial tension).

The greater the adhesion tension, the greater the preferential wetting of the liquid for a solid. Adhesion tension is the measure of the degree of wetting of a solid by a liquid and varies with the nature of the solid. It defines the physical properties of the solid surface in its action towards various polar and non-polar liquids, i. e. hydrophilic, hydrophobic, oleophilic, oleophobic. Carbon is hydrophobic, whereas alumina, silica and calcium flouride are hydrophilic. Liquids more polar than n-butyl acetate preferentially wet alumina and silica, whereas less polar liquids preferentially wet carbon. In general, the solids tend to go to the water phase if they adsorb water to the exclusion of organic liquids or to the organic phase if they adsorb the latter to the exclusion of water.

The strength of the adhesion forces between liquids and solids is dependent on the mechanical and specific forces developed. Mechanical force is the resultant of the anchorage of the liquid to the solid surface by penetration and solidification in the pores and depressions of the surface. Specific forces are the physical and chemical forces determining the degree of wetting and affinity between the film and surface as described supra. Adhesion is affected by forces of surface orientation and wetting and is largely influenced by colloidal phenomena.

Oils and oily substances found in oil slicks are non-polar organic liquids whose adsorption on solid surfaces will, as shown above, depend on the nature of the solid surface. The fundamental idea of this invention is the fact that stable oil suspensions are prepared by the use of comminuted mineral aggregates or powders containing pronounced oleophilic and hydrophobic surface properties. The powder is spread by any suitable means over the surface of the oil. A stable suspension of powder and oil is formed immediately upon contact of the two constituents. Due to the hydrophobic character of the powder, the presence of moisture in close proximity to the surface will not interfere with the oil adsorption properties. The oil will immediately displace the water. Due also to its hydrophobic characteristics, the powder, when sprayed on the surface of the water, will float until it comes into contact with oil or until the balanced surface tension supporting the powder is destroyed by agitation of the surface. As a result of the formation of the stable oil-powder suspension, the lighter-than-water oil slick is converted into a heavier than water oil-powder suspension with subsequent submersion and removal from the surface. The suspension is either embedded on the bottom under a quiescent body of water or is carried away in the rapid undercurrent in a stream of water.

Oleophilic and hydrophobic powders are applicable to the problem of removal of non-polar liquids from solid surfaces such as ship sides, piers, pilings, floats and docks. The oily surface is completely saturated with the powder. The marked affinity and preferential adsorption of the oil by the powder results in the formation of a strongly bonded oil-powder mixture which can be readily flushed from the solid surface by subjecting it to a high pressure stream of water from a hose thereby removing all surface oil in the process.

The powder is applicable to the problem of extinguishing oil or gasoline fires on water. The powder is sprayed on flaming oil in liberal quantites. The oil and powder immediately unite and are submerged with the result that the source of the flame, i. e., oil, gasoline or other flammable organic liquid, is rapidly removed from the water surface and the flame is extinguished.

In order to dispose of oil by discharge into water without the accompanying oil slick formation, the oleophilic and hydrophobic powder may be mixed thoroughly with the oil prior to discharge. The resultant oil-powder suspension immediately sinks in water, leaving a clean, oil-free surface on the water.

There are numerous powders which may be classified as oleophilic and hydrophobic, viz., carbon blacks, mineral blacks, graphite, and all surfaces containing carbon or carbonaceous groups. This invention covers the use of any powder or solid included in this class of materials.

Besides the number of powders which contain oleophilic and hydrophobic surface characteristics, powders which possess the desired surface properties can be developed by deposition of a suitable coating material on an inert mineral base such as silica, clay, whiting, pumice stone, infusorial earth etc. The coating must adhere firmly to the inert base and yield pronounced oil binding characteristics. An example of an economical powder which has been prepared and found suitable for the purposes stated above is as follows:

Dissolve a petroleum asphalt containing a high fixed carbon content in Navy fuel oil, grade II (60 parts by weight asphalt and 40 fuel oil) by heating the mixture until homogeneous and free from lumps. Add one ton of finely divided sand and 120 pounds of the asphalt-fuel oil mixture to a mixer and heat to approximately 700° F., mixing continuously. Sieve the treated sand to remove any large aggregates which may be present. The finer the grade of sand, the greater will be the oil adsorption due to the increased surface area. Numerous coating materials may be substituted for the fuel oil-asphalt mixture, viz., mineral oil, vegetable oil, asphalts, tars, lubricating oils, sawdust, seaweed, peat etc. Any mineral aggregate may be coated by this process.

The treated sand produced by the above process results in the formation of a firmly bound coating on the particles which show excellent oil binding properties. Fifteen pounds of the treated sand adsorbs one gallon of fuel oil to form a suspension that remains stable and shows no signs of separation after six months submersion. In a test on oil slicks at the Norfolk Navy Yard, an average of one pound of treated sand was found to clear two square feet of an area covered with oil.

Oleophilic and hydrophobic coatings can be produced with the aid of a number of types of compounds. Metallic soaps of organic acids such as stearates, oleates, resinates, linoleates, tallates of aluminum, calcium, magnesium may be deposited on powders by any suitable means, e. g. mixture of the powder with a dilute solution of the treating agent and subsequent evaporation of the solvent.

Included within the scope of this invention is the use of finely divided oleophilic and hydrophobic powders that can be applied to the oil to form a firm mass which will remain afloat in cases where the removal of the oil from the surface of the water is necessary. The minute particle size and porous surface structure of the powder results in the adsorption of considerable air which can only be partially displaced by contact with oil. The powder will adsorb oil in preference to water. The resultant mixture will contain oil, air and powder and the specific gravity will be less than that of water, therefore remaining afloat. The suspension can be readily removed from the surface of the water by any suitable means such as scooping from the surface through voile or wire screen. The water will pass through the screen but the suspension is retained. The oil can be reclaimed from the powder by distillation or removed by ignition and the powder can be reused indefinitely. Many types of materials are included in the group of suitable substances, e. g. carbon blacks, gas blacks, and carbon coated, porous, finely divided powders such as diatomaceous silica, bentonite clays, etc.

From the foregoing description it is evident that the range of modifications and applications which may be effected by this process is very great. The invention, therefore, should not be considered as being limited in scope to the specific illustrations given, but should be understood to include all reasonable equivalents of the materials and processes which have been specifically mentioned to the extent as defined by the herewith appended claims.

The invention described herein may be manufactured and used by or for the Government of the United States of America for governmental purposes without the payment of any royalties thereon or therefor.

I claim:
1. The method of removing an oleaginous substance from the surface of water which comprises contacting the oleaginous substance with water insoluble granular particles of a specific gravity greater than one having a surface consisting essentially of solid carbon, and thereafter agitating said particles to cause them to sink.
2. The method of removing an oleaginous substance from the surface of a solid which comprises contacting the oleaginous substance with water insoluble granular particles of a specific gravity greater than one having a surface consisting essentially of solid carbon, and thereafter flushing said particles from the surface of the solid with a stream of water.
3. The method of removing an oleaginous substance from surfaces subject to the presence of water comprising contacting the oleaginous substance with a water insoluble powder consisting essentially of particles having a surface consisting essentially of solid carbon.
4. The method of removing an oleaginous substance from surfaces subject to the presence of water comprising contacting the oleaginous substance with a water insoluble powder consisting essentially of particles having a permanently adhering coating consisting essentially of solid carbon.
5. The method of removing an oleaginous substance from the surface of water which comprises contacting the oleaginous substance with particles of sand having a permanently adhering coating consisting essentially of solid carbon, and thereafter agitating said particles to cause them to sink.
6. The method of removing an oleaginous substance from the surface of a solid which comprises contacting the oleaginous substance with particles of sand having a permanently adhering coating consisting essentially of solid carbon, and thereafter flushing said particles from the surface of the solid with a stream of water.

IRVIN BAKER.

REFERENCES CITED

The following references are of record in the file of this patent:

UNITED STATES PATENTS

| Number | Name | Date |
| --- | --- | --- |
| 144,910 | Kersting | Nov. 25, 1873 |
| 1,722,871 | Weber et al. | July 20, 1929 |
| 2,059,983 | Dent et al. | Nov. 3, 1936 |
| 2,367,384 | Tymstra et al. | Jan. 16, 1945 |